United States Patent
Giovanini

(10) Patent No.: US 9,975,811 B2
(45) Date of Patent: May 22, 2018

(54) SINTERED CERAMIC BALL AND METHOD OF MAKING SAME

(71) Applicant: COORSTEK, INC., Golden, CO (US)

(72) Inventor: Donald Robert Giovanini, Golden, CO (US)

(73) Assignee: CoorsTek, Inc., Golden, CO (US)

( * ) Notice: Subject to any disclaimer, the term of this patent is extended or adjusted under 35 U.S.C. 154(b) by 397 days.

(21) Appl. No.: 14/737,755

(22) Filed: Jun. 12, 2015

(65) Prior Publication Data

US 2015/0368160 A1    Dec. 24, 2015

Related U.S. Application Data

(60) Provisional application No. 62/014,398, filed on Jun. 19, 2014.

(51) Int. Cl.
| | | |
|---|---|---|
| C04B 35/64 | (2006.01) | |
| C04B 35/10 | (2006.01) | |
| C04B 37/00 | (2006.01) | |

(52) U.S. Cl.
CPC ............ *C04B 35/10* (2013.01); *C04B 37/001* (2013.01); *C04B 2235/612* (2013.01); *C04B 2235/94* (2013.01); *C04B 2235/96* (2013.01); *C04B 2235/9638* (2013.01); *C04B 2237/343* (2013.01); *C04B 2237/76* (2013.01); *C04B 2237/84* (2013.01); *Y10T 428/131* (2015.01)

(58) Field of Classification Search
CPC .............. C04B 35/64; C04B 2235/612; C04B 2235/94; B29L 2022/00; B29L 2022/002
USPC .................................................. 264/632–633
See application file for complete search history.

(56) References Cited

U.S. PATENT DOCUMENTS

| | | | | |
|---|---|---|---|---|
| 2,599,268 | A * | 6/1952 | Maculan | B28B 1/004 156/89.11 |
| 4,917,857 | A * | 4/1990 | Jaeckel | B01J 35/08 264/45.3 |
| 5,252,273 | A * | 10/1993 | Sakai | B28B 7/342 264/221 |
| 5,419,860 | A * | 5/1995 | Menchhofer | B22F 3/22 264/109 |
| 5,523,037 | A * | 6/1996 | Kitayama | C04B 35/622 264/610 |
| 5,676,193 | A * | 10/1997 | Hand | B02C 15/005 164/112 |
| 9,862,879 | B2 * | 1/2018 | Chatterjee | C09K 8/80 |

(Continued)

*Primary Examiner* — Erin Snelting
(74) *Attorney, Agent, or Firm* — Faegre Baker Daniels LLP

(57) ABSTRACT

A sintered ceramic ball is described that includes an incomplete ceramic ball portion with a wall with an exterior surface, the wall having an interior space located radially interior of an inner surface of the wall. The incomplete ceramic ball portion also has an exterior surface, the exterior surface having an exterior surface area. The sintered ceramic ball further includes a ceramic plug joined with the incomplete ceramic ball portion to form a continuous exterior ball surface. The ceramic plug includes an exterior plug surface and a plug wall. The plug surface includes an exterior plug surface area, wherein the exterior plug surface area is between about 5% to 49.9% of the sum of the exterior surface area of the incomplete ceramic ball portion and the exterior plug surface area. The interior space of the sintered ceramic ball is sealed within the wall and the plug wall.

6 Claims, 13 Drawing Sheets

(56) References Cited

U.S. PATENT DOCUMENTS

| | | | |
|---|---|---|---|
| 2006/0162929 A1* | 7/2006 | Urbanek | C04B 35/443 166/280.2 |
| 2009/0044941 A1* | 2/2009 | De Paiva Cortes | C04B 35/10 166/280.1 |
| 2012/0190597 A1* | 7/2012 | Chatterjee | B28B 3/14 507/269 |
| 2013/0206408 A1* | 8/2013 | Chatterjee | C04B 33/1352 166/280.1 |
| 2013/0244914 A1* | 9/2013 | Wu | C04B 35/117 507/269 |
| 2015/0247084 A1* | 9/2015 | Epstein | C04B 35/111 427/372.2 |

* cited by examiner

SINTERED CERAMIC BALL AND METHOD OF MAKING SAME

CROSS-REFERENCE TO RELATED APPLICATIONS

The present application claims the benefit of U.S. Provisional Patent Application No. 62/014,398 filed on Jun. 19, 2014, the content of which is incorporated herein by reference in its entirety.

FIELD

The present invention is related to a sintered ceramic ball. One or more embodiments of the sintered ceramic ball have use at least in the field of hydraulic fracturing operations at an oil and gas well.

BACKGROUND

Hydraulic fracturing is being performed in a variety of locations across the United States and in other countries to improve production of oil and gas wells. There is a need for additional devices, systems and/or methods to improve hydraulic fracturing operations.

SUMMARY

It is to be understood that the present invention includes a variety of different versions or embodiments, and this Summary is not meant to be limiting or all-inclusive. This Summary provides some general descriptions of some of the embodiments, but may also include some more specific descriptions of other embodiments.

The sintered ceramic balls and/or hollow ceramic balls described herein are suitable for use in hydraulic fracturing operations. More particularly, sintered ceramic balls and/or hollow ceramic balls can be used to create a seal against a seat of a device placed down a well bore, thereby preventing or limiting flow during certain portions of hydraulic fracturing operations at an oil and gas well. Once a desired portion of the hydraulic fracturing operation is complete, the ceramic balls can be broken into pieces smaller than its original size, thereby allowing the broken pieces to be conveyed away from the seat.

Accordingly, embodiments of the sintered hollow ceramic balls described herein are suitable for providing the desired spherical structure during certain phases of the fracturing process, but possess low enough ultimate crush strengths that allow the balls to be broken when desired. Thus, in at least a first mode of use, one or more ceramic balls described herein can be used in a valve with a seat to prevent or limit flow in at least one direction by contacting the seat and preventing or limiting flow through or around the valve seat. After the first mode of use, the one or more ceramic balls are broken and flushed or conveyed away from the valve seat.

In at least one embodiment, a ceramic ball is made using two pieces including: (1) a partial ball (also referred to herein as the "incomplete ball portion") and (2) a plug. In at least one embodiment, a plug exterior surface area comprises less than 50% of a total exterior surface area of the ceramic ball. In a least one embodiment, the hollow ceramic ball possesses a compressive strength of greater than 10,000 psi.

In at least one embodiment, the inner surface of the incomplete ball portion includes at least one feature to promote breakage of the ball along a certain alignment. By way of example and not limitation, when forming the interior of the incomplete ball portion, the inner surface of the incomplete ball portion may include furrows and/or a series of striations, wherein upon application of a crushing force as applied to the finished ceramic ball, the ceramic ball preferentially fails along at least some of the series of furrows and/or striations. Such features advantageously provide a ceramic ball that fractures into smaller or more desirable sized pieces that can be conveyed away from a valve seat.

Accordingly, in at least one embodiment, a sintered ceramic ball is provide, the sintered ceramic ball comprising:
an incomplete ceramic ball portion including a wall with an exterior surface and an exterior surface area, the incomplete ceramic ball portion having an interior space located radially interior of an inner surface of the wall; and
a ceramic plug including an exterior plug surface and a plug wall, the exterior plug surface including an exterior plug surface area;
wherein the ceramic plug is joined with the incomplete ceramic ball portion to form a continuous exterior ball-shaped surface
wherein the exterior plug surface area is between about 5% to 49.9% of a sum of the exterior surface area of the incomplete ceramic ball portion and the exterior plug surface area; and
wherein the interior space is sealed within the wall and the plug wall.

In at least one embodiment, the incomplete ball portion has an outside diameter greater than 0.5 inches. In at least one embodiment, the incomplete ball portion has an outside diameter of between about 0.5 to 6 inches. In at least one embodiment, the sintered ceramic ball has a compressive strength of greater than 10,000 psi. In at least one embodiment, the sintered ceramic ball has a compressive strength of greater than 15,000 psi. In at least one embodiment, the sintered ceramic ball has a compressive strength of greater than 20,000 psi. In at least one embodiment, the continuous exterior ball-shaped surface is glazed. In at least one embodiment, the interior space includes a liquid. In at least one embodiment, an inner plug surface of the ceramic plug is substantially flush with an adjacent portion of the inner surface of the wall of the incomplete ceramic ball portion. In at least one embodiment, an inner plug surface of the ceramic plug located radially interior to an adjacent portion of the inner surface of the wall of the incomplete ceramic ball portion. In at least one embodiment, the ceramic material includes $Al_2O_3$. In at least one embodiment, at least a portion of the interior space is shaped like a sphere. In at least one embodiment, the interior space is not substantially spherical in shape. In at least one embodiment, the ceramic plug is solid or substantially solid. In at least one embodiment, the inner surface of the wall of the incomplete ceramic ball portion includes at least one of furrows and striations.

A method of making a ceramic ball is also provided. Accordingly, in least one embodiment, a method of making a sintered ceramic ball is provided, the method comprising:
forming an incomplete ball portion, the incomplete ball portion including an exterior surface and a wall with an opening contiguous with a hollow space radially interior to an inner surface of the wall;
after forming the incomplete ball portion, inserting a plug into the opening of the incomplete ball portion; and after inserting the plug into the opening of the incomplete ball portion, sintering the incomplete ball portion and the plug to form a sintered ceramic ball;

wherein an exterior plug surface area is between about 5% to 49.9% of a sum of an exterior surface area of the incomplete ceramic ball portion and the exterior plug surface area.

In at least one embodiment, the step of forming an incomplete ball portion includes forming one or more of furrows and striations along the inner surface of the wall. In at least one embodiment, the step of inserting the plug into the opening includes applying a material to a sideslope of at least one of the opening of the incomplete ball portion and the plug. In at least one embodiment, the sideslope is aligned along a radius of the incomplete ball portion. In at least one embodiment, the step of sintering includes orienting the plug in a downward orientation relative to the incomplete ball portion. In at least one embodiment, the method further comprises drilling a hole into the sintered ceramic ball and inserting a liquid into a hollow space of the sintered ceramic ball after the sintering step.

In at least one embodiment, the contacting sideslopes of both the incomplete ball portion and the plug are smooth, with the sideslope surfaces contacting each other during the sintering process. In another embodiment, the sideslopes of both the incomplete ball portion and the plug include mating threads. That is, the plug includes threads that are configured to be received by threads on the sideslopes of the incomplete ball portion. Accordingly, the plug is screwed into the incomplete ball portion, and thereafter the joined pieces are sintered together (that is, they are co-fired as a single joined unit wherein the plug resides within the hole of the incomplete ball portion during firing).

As noted above, in at least one embodiment, the joined pieces of the incomplete ball portion and the plug are sintered with the plug oriented at the bottom of the unsintered hollow ceramic ball. Such a configuration during the sintering process assists in mating the sideslopes of the plug with the sideslopes of the incomplete ball portion, thereby substantially sealing the hollow space residing within the unsintered hollow ceramic ball.

In at least one embodiment, a joining compound or glue is used when inserting the plug into the opening of the incomplete ball portion. Upon being sintered, the plug is joined or sufficiently mated to the incomplete ball portion, thereby forming a sintered ceramic ball as described herein.

In another embodiment, a glaze is applied to the sintered ceramic, and thereafter, the glaze is fired.

For one or more embodiments described herein, and depending upon one or more factors, including the types of materials used and/or the closeness of the fit between the plug and the incomplete ball portion, one or more substances may be used to join the plug to the incomplete ball portion, such as glue.

As mentioned above, in at least one embodiment, a liquid is inserted into the finished ball to provide a ceramic ball with a liquid-filled void space. The liquid is inserted into the ball after the ball is made by drilling one or more relatively small access holes through the ball wall and thereafter inserting a liquid through the hole. The hole is preferably sealed with an epoxy or similar material. The liquid-filled ball possesses different strength characteristics than that of a ceramic ball having air or a gas within the hollow space of the ball. More particularly, the liquid-filled ball has a higher crush strength.

Various components are referred to herein as "operably associated." As used herein, "operably associated" refers to components that are linked together in operable fashion, and encompasses embodiments in which components are linked directly, as well as embodiments in which additional components are placed between the two linked components.

As used herein, "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Various embodiments of the present inventions are set forth in the attached figures and in the Detailed Description as provided herein and as embodied by the claims. It should be understood, however, that this Summary does not contain all of the aspects and embodiments of the one or more present inventions, is not meant to be limiting or restrictive in any manner, and that the invention(s) as disclosed herein is/are understood by those of ordinary skill in the art to encompass obvious improvements and modifications thereto.

Additional advantages of the present invention will become readily apparent from the following discussion, particularly when taken together with the accompanying drawings.

BRIEF DESCRIPTION OF THE DRAWINGS

To further clarify the above and other advantages and features of the one or more present inventions, a more particular description of the one or more present inventions is rendered by reference to specific embodiments thereof which are illustrated in the appended drawings. It should be appreciated that these drawings depict only typical embodiments of the one or more present inventions and are therefore not to be considered limiting of its scope. The one or more present inventions are described and explained with additional specificity and detail through the use of the accompanying drawings in which.

The drawings are not necessarily to scale.

DETAILED DESCRIPTION

One or more embodiments of the one or more inventions described herein include a sintered ceramic ball, such as, but not limited to, a sintered hollow ceramic ball having a 1 to 6 inch outer diameter. As described in detail below, in at least one embodiment the sintered hollow ceramic ball is made using two pieces: (1) an incomplete ball portion; and (2) a plug.

Sintered Hollow Ceramic Ball and Components Thereof

Figure 1:
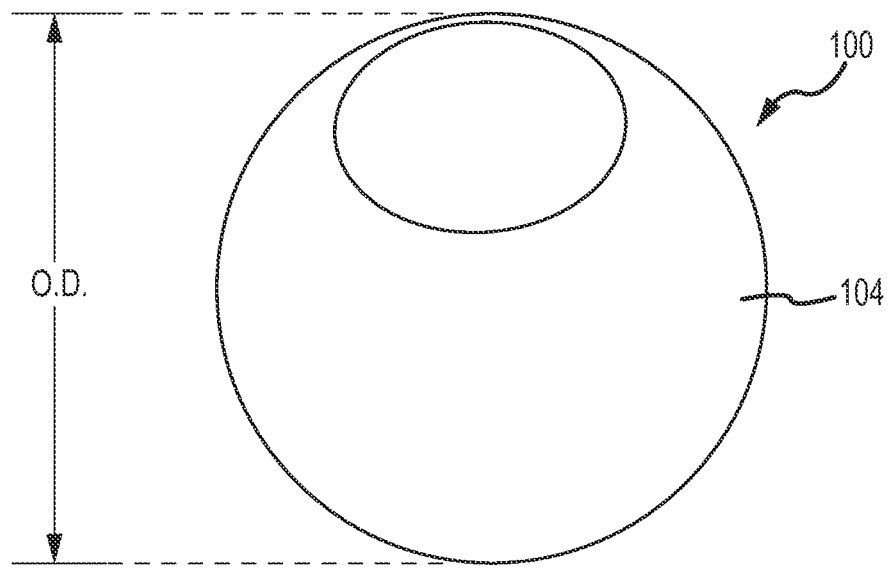
FIG. 1 is a perspective view of an embodiment of a sintered ceramic ball.

Referring now to FIG. 1, and in accordance with at least one embodiment of the one or more present inventions described herein, a sintered ceramic ball 100 is illustrated. The sintered ceramic ball 100 includes an exterior ball surface 104, and in a preferred embodiment, includes a hollow interior space. The exterior ball surface 104 resembles a sphere, but may not be perfectly spherical. That is, the exterior ball surface 104 is sphere-like, or round, or roundish in shape, and therefore, the term "ball" is used herein.

Figure 2:
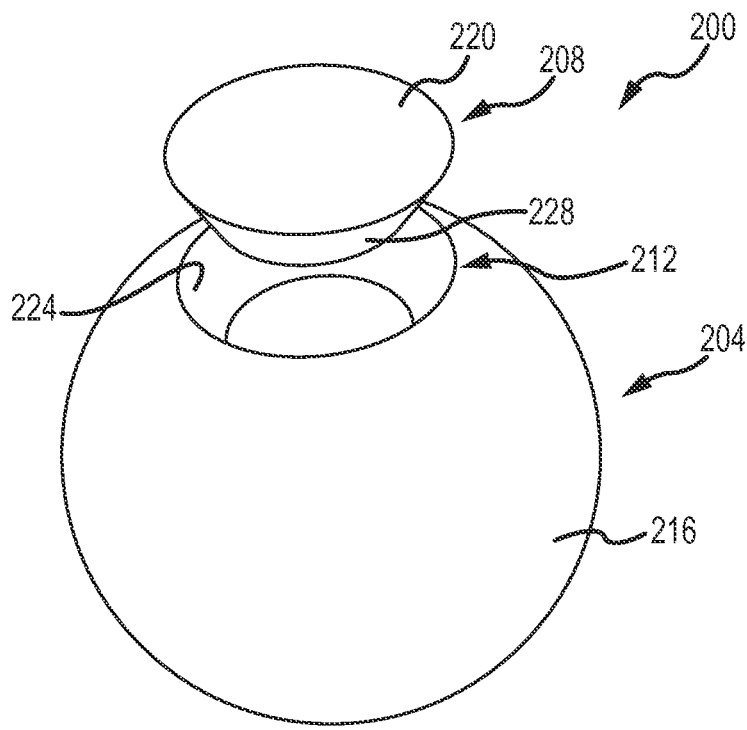
FIG. 2 is a perspective view of an incomplete ball portion and a plug that form an unsintered ceramic ball that is subsequently sintered to yield the sintered ceramic ball shown in FIG. 1.

Referring now to FIG. 2, during manufacture, an unsintered hollow ceramic ball 200 preferably includes two portions, an incomplete ball portion 204 and a plug 208. Each piece is made separately and then the two pieces are joined together to form the unsintered hollow ceramic ball 200, which is later sintered to form the sintered ceramic ball 100. In at least one embodiment, an incomplete ball portion 204 is hollow with an opening 212, wherein the opening 212 is sized to receive the plug 208. The incomplete ball portion 204 further includes an exterior surface 216, wherein the exterior surface 216 of the incomplete ball portion 204 corresponds to the exterior ball surface 104 of the unsintered hollow ceramic ball 200 with the exception of the opening 212, wherein the plug 208 is placed upon assembly of the plug 208 into the opening 212 of the incomplete ball portion 204. Accordingly, incomplete ball portion 204 includes opening sideslopes 224 that contact and join with the plug sideslopes 228 when the plug 208 is fitted into the opening 212 of the incomplete ball portion 204.

Still referring to FIG. 2, in at least one embodiment, the size of the plug 208 is less than one half the size of the unsintered hollow ceramic ball 200. Accordingly, the sintered ceramic ball 100 is not made by mating two half balls or two half spheres. More preferably, in at least one embodiment, the exterior surface area of the plug 208 is less than about 25% of the entire surface area of the sintered ceramic ball 100, where the exterior surface area of the plug 208 is defined as the plug exterior surface 220 of the plug 208 that becomes continuous with the exterior surface 216 of incomplete ball portion 204 to form the exterior ball surface 104 of the sintered ceramic ball 100 once the plug 208 is inserted into the incomplete ball portion 204 and the unsintered hollow ceramic ball 200 is sintered. For example, if the sintered ceramic ball 100 has a desired outer diameter ("OD", as illustrated in FIG. 1) of approximately 4.00 inches, the sintered ceramic ball 100 has an exterior surface area of approximately 50.3 square inches (where Area≈$\pi d^2$; assuming the sintered ceramic ball 100 closely resembles a sphere). The exterior surface area of the plug 208, therefore, occupies a fractional portion of less than one half of the exterior surface area of the sintered ceramic ball 100, such as less than about 25% of the entire surface area of the sintered ceramic ball 100, and more preferably, less than about 20% of the entire surface area of the sintered ceramic ball 100, and more preferably yet, less than about 15% of the entire surface area of the sintered ceramic ball 100, and still more preferably yet, between about 5 to 10% of the entire surface area of the sintered ceramic ball 100. This fractional surface area of the plug 208 provides a sintered ceramic ball 100 that provides a suitable strength for certain use or operational requirements, such as hydraulic fracturing operations, but yet can be broken under sufficient force, thereby allowing the sintered ceramic ball 100 to serve as a disposable valve closure mechanism during hydraulic fracturing operations.

Figure 3:
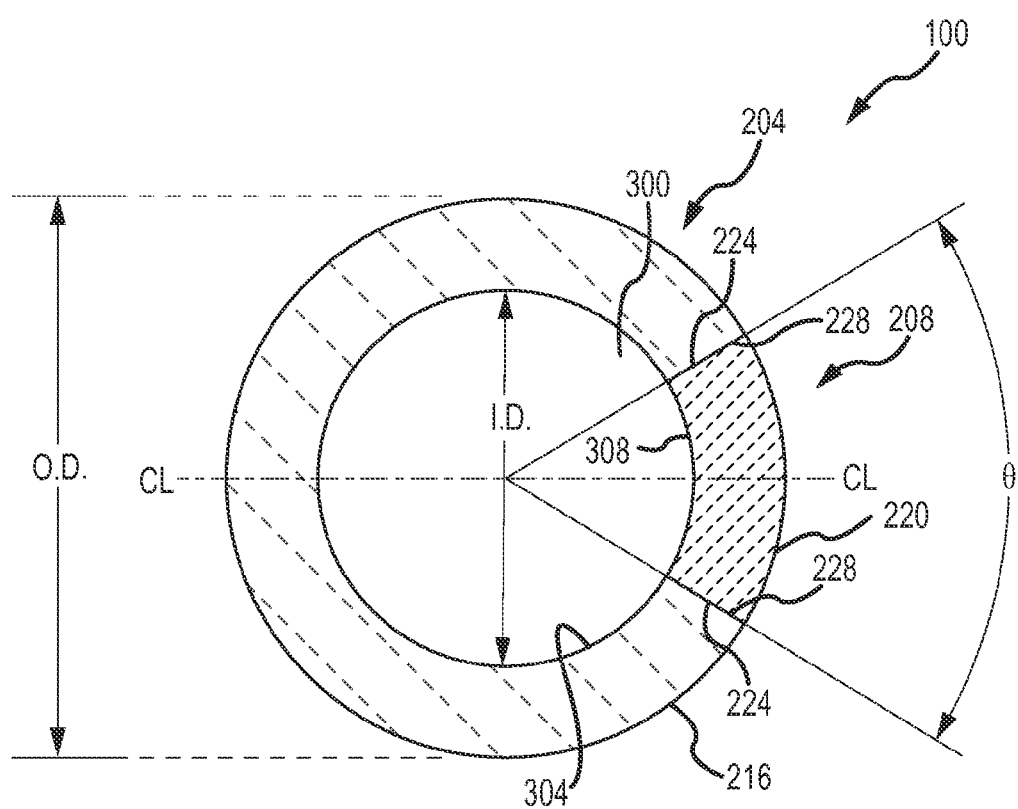
FIG. 3 is a cross-sectional view of a hollow ceramic ball wherein an inner surface of the plug is flush or substantially flush with the adjacent inner surface of the incomplete ball portion.

Referring now to FIG. 3, the incomplete ball portion 204 has an outer diameter (labeled "OD") and an inside diameter (labeled "ID"). Residing within the incomplete ball portion 204 is hollow region or hollow space 300, wherein the hollow space 300 is not comprised of ceramic material but is typically comprised of air (although in at least one embodiment described in further detail below, after forming the hollow ceramic ball, the hollow space 300 may be filled with a material, such as a liquid, thereby displacing some or all of the air initially present in the hollow space 300). For the incomplete ball portion 204, each of the outer diameter and the inner diameter may vary within certain tolerances, such as ±2%, and more preferably, ±1%. For example, for a sintered ceramic ball 100 having a desired outside diameter of 5.00 inches with a tolerance of ±1%, the outside diameter would fall between 4.95 inches and 5.05 inches. Thus, within these tolerances, the incomplete ball portion 204 has a substantially constant wall thickness between an inner surface 304 of the incomplete ball portion 204 and the exterior surface 216 of the incomplete ball portion 204. As those skilled in the art will appreciate, the wall thickness can be tailored to provide a desired compressive strength, wherein other factors influencing the compressive strength include the type and purity of the ceramic material used to form the incomplete ball portion 204 and the plug 208.

Referring still to FIG. 3, the plug 208 is preferably solid. In at least one embodiment, the plug 208 has an inner surface 308 that has approximately the same radius of curvature as the radius of curvature of the inner surface 304 of the incomplete ball portion 204. In addition, the inner surface 308 of the plug 208 forms a substantially continuous interior surface with the inner surface 304 of the incomplete ball portion 204. More particularly, in at least one embodiment, the inner surface 308 of the plug 208 is substantially flush with the adjacent inner surface 304 of the incomplete ball portion 204.

Referring still to FIG. 3, in at least one embodiment, plug sideslopes 228 of the plug 208 preferably fit against and contact the adjacent opening sideslopes 224 of the incomplete ball portion 204, wherein with the addition of glue or a joining compound, the plug 208 joins the incomplete ball portion 204 to form a single integral piece upon sintering, thus yielding a sintered ceramic ball 100.

Figure 4:
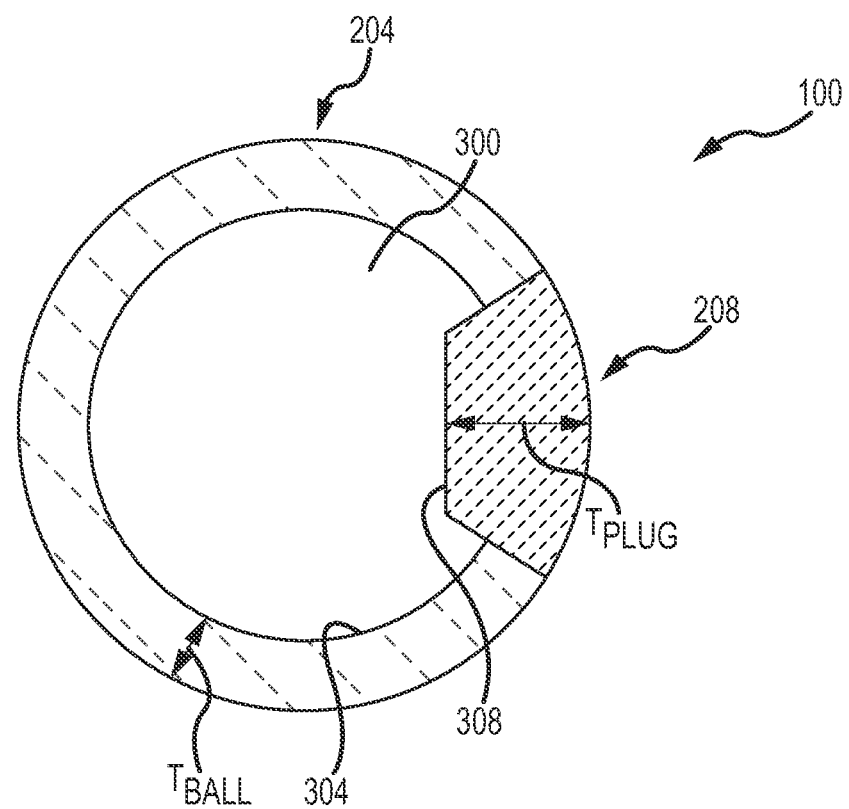
FIG. 4 is a cross-sectional view of the hollow ceramic ball wherein an inner surface of the plug is radially deeper within the hollow region than the inner surface of the incomplete ball portion.
Figure 5:
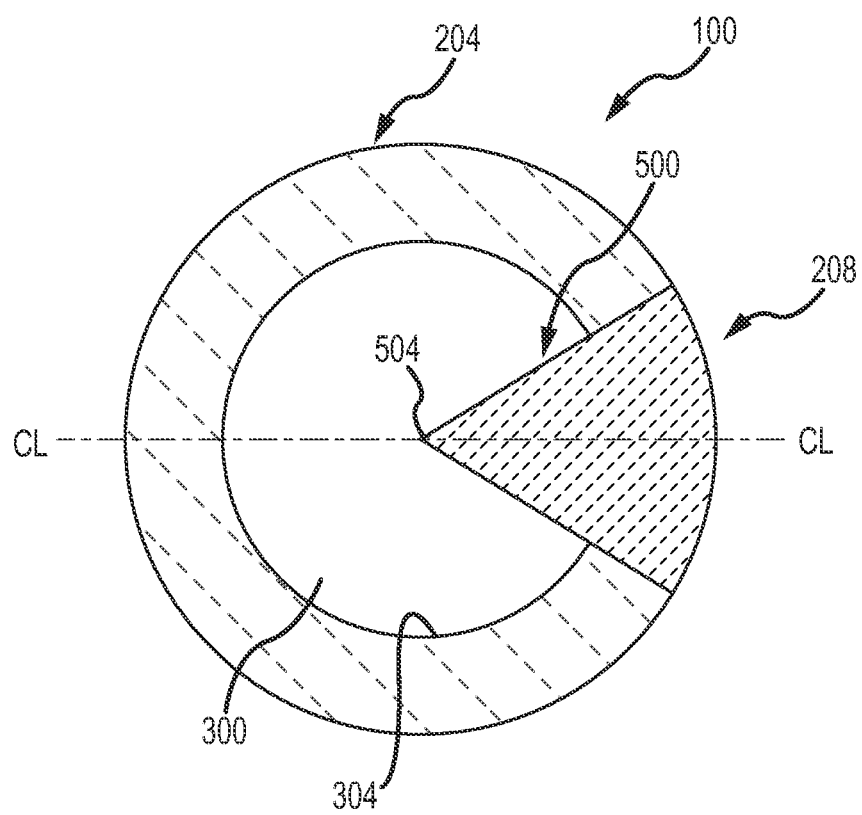
FIG. 5 is a cross-sectional view of an embodiment of a hollow ceramic ball wherein the plug is similar in shape to a spherical cone or a portion of a spherical cone.

Referring now to FIG. 4, in at least one embodiment the inner surface 308 of the plug 208 may extend deeper into the hollow space 300 than the adjacent inner surface 304 of the incomplete ball portion 204. Accordingly, in at least one embodiment, the inner surface 308 of the plug 208 does not match and/or does not necessarily align with the adjacent inner surface 304 of the incomplete ball portion 204. Therefore, the plug wall thickness $T_{plug}$ of the plug 208 can be thicker than the wall thickness $T_{ball}$ of the incomplete ball portion 204. Moreover, as depicted in FIG. 5, the plug 208 may be a spherical cone 500 with an internal tip 504 located approximately at or near a center of the sintered ceramic ball 100. Alternatively, and referring back to FIG. 4, the interior extent of the spherical cone 500 may be truncated and not extend to or near the center of the sintered ceramic ball 100.

Figure 6:
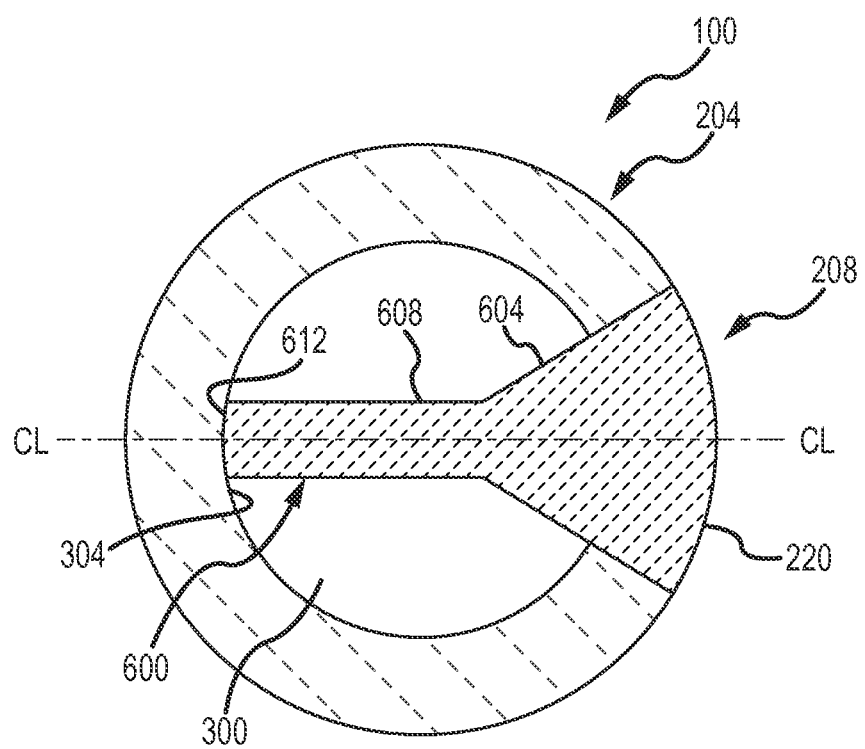
FIG. 6 is a cross-sectional view of an embodiment of a hollow ceramic ball wherein the plug includes a post that extends within the hollow space to contact and/or reside adjacent an inner surface of the incomplete ball portion.

Referring now to FIG. 6, yet another alternative embodiment of a plug 208 is shown, wherein the plug 208 includes a post 600 that extends to the inner surface 304 of the incomplete ball portion 204. More particularly, the plug 208 depicted in FIG. 6 includes a first portion 604 that resembles at least a portion of a spherical cone. In addition, the plug 208 further includes a second portion 608 that preferably has a longitudinal end 612 that contacts or otherwise resides radially interior and substantially adjacent to the inner surface 304 of the incomplete ball portion 204 at a location opposite the exterior surface 220 of the plug 208. Thus, in at least one embodiment, the plug 208 extends along a center line CL of the sintered ceramic ball 100, with an exterior surface 220 and a longitudinal end 612 that contacts the interior surface 304 of the incomplete ball 204. The configuration of the plug 208 with the post 600 serves to provide support for the plug 204 during manufacturing, and further serves to modify the compressive strength of the sintered ceramic ball 100 depicted in FIG. 6.

Figure 7:
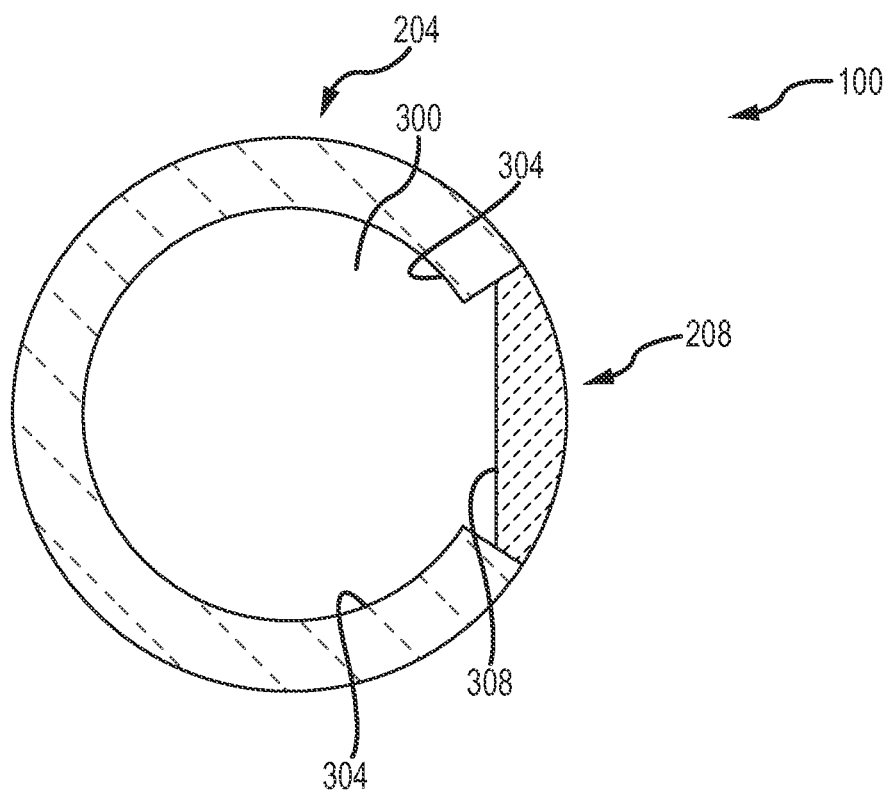
FIG. 7 is a cross-sectional view of a hollow ceramic ball wherein an inner surface of the plug is radially shallower within the hollow region than the inner surface of the incomplete ball portion.

In yet another embodiment, and as depicted in FIG. 7, the inner surface 308 of the plug 204 can be shallower than an adjacent inner surface 304 of the incomplete ball portion 204. Such configurations offer modifications in the local strength of the sintered ceramic ball 100. That is, a flush, thicker or thinner wall thickness associated with the plug 208 influences the compressive strength of the finished sintered ceramic ball 100 and can be modified to provide the desired compressive strength sought for a given sintered ceramic ball 100.

Although the radially interior portion of the plug 208 may vary as described herein, for the various embodiments of the hollow ceramic balls 100 described herein, the plug exterior surface 220 of plug 208 has a radius of curvature that substantially matches the radius of curvature of the exterior surface 216 of the incomplete ball portion 204, thus yielding a finished sintered ceramic ball 100 with a substantially continuous exterior surface 104, at least within the tolerances noted above. That is, the outer diameter OD of the sintered ceramic ball 100 at a location corresponding to plug 208 preferably does not deviate more than ±2% of the intended outer diameter of the sintered ceramic ball 100, and more preferably, does not deviate more than ±1% of the intended outer diameter of the sintered ceramic ball 100.

Figure 8:
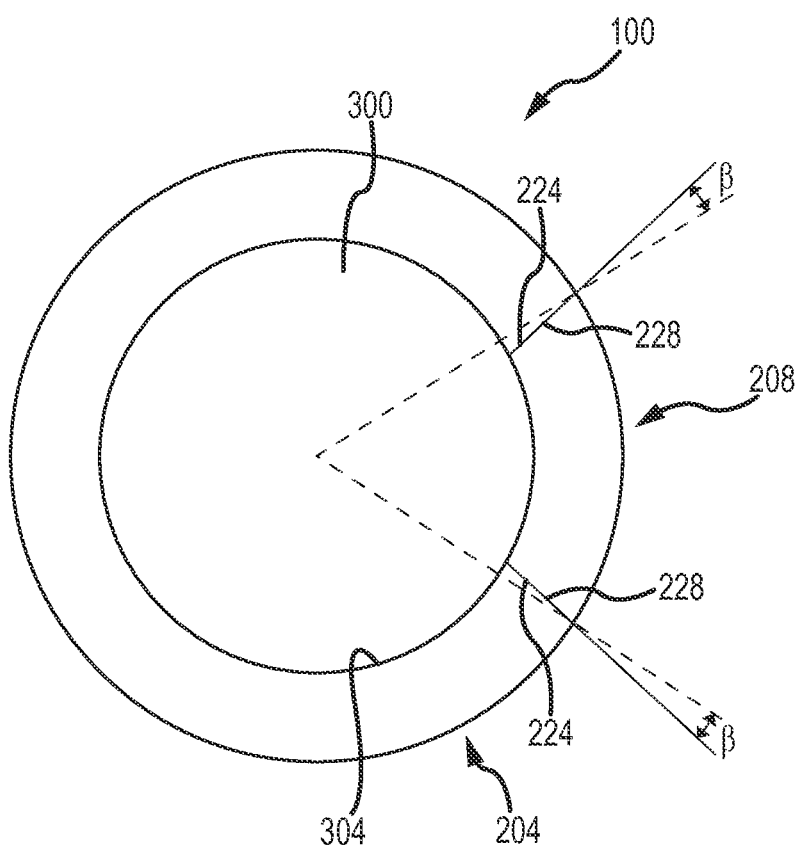
FIG. 8 is a side cut-away view of an embodiment of a hollow ceramic ball with illustrated sideslopes of the plug.

Referring back to FIG. 3, and in accordance with at least one embodiment, the slopes 224 forming the opening 212 to the hollow space 300 extend along a radius associated with the incomplete ball portion 204 and the sintered ceramic ball 100. Alternatively, and with reference now to FIG. 8, the slopes 224 forming the opening 212 to the hollow space 300 (and common to the sideslopes 228 the plug 208) may be oriented at an angle β, wherein the angle β is shallower than a line extending along the radius of the incomplete ball portion 204 and the sintered ceramic ball 100. By way of example and not limitation, angle β may be approximately 10 degrees (that is, 10 degrees separation as measured from a line extending along a radius of the incomplete ball portion 204 and the sintered ceramic ball 100).

Figure 9:
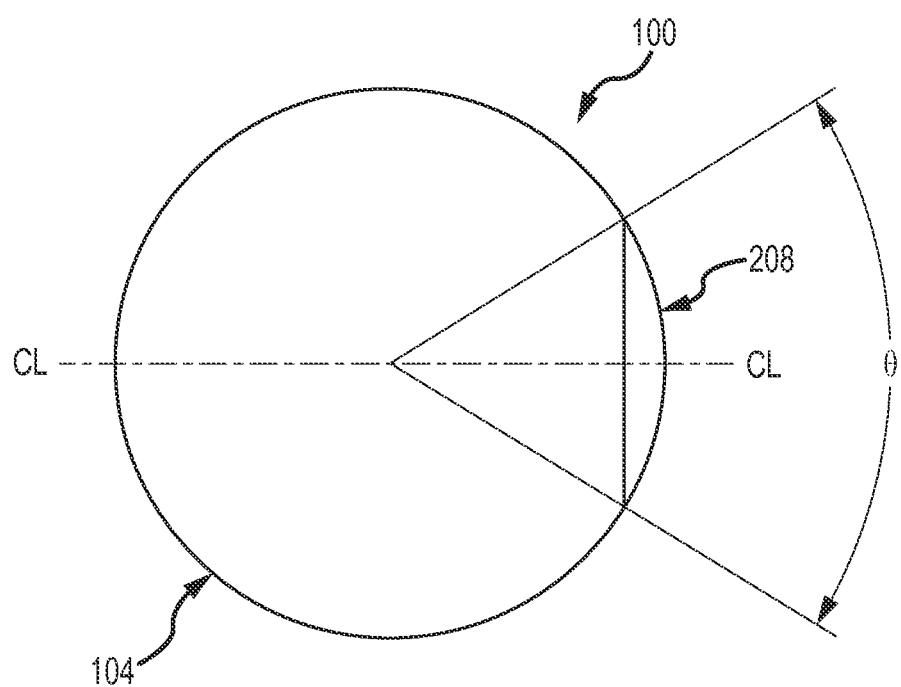
FIG. 9 is a side elevation view of the hollow ceramic ball shown in FIG. 1 illustrating the exterior arc extent of the plug.

Referring now to FIG. 9, and in accordance with at least one embodiment, a plug 208 is shown with a center line CL oriented with a diameter of the sintered ceramic ball 100 and the plug 208. The outer limits of the plug 208 along the exterior surface 104 of the sintered ceramic ball 100 occupies an arc θ spanning between approximately 30 to 90 degrees (as measured from the center of the sintered ceramic ball 100), and more preferably, occupies an arc spanning between approximately 45 to 75 degrees, and more preferably yet, occupies an arc spanning between approximately 50 to 70 degrees. The opening 212 in the incomplete ball portion 204 is thus limited in extent, thereby providing a more continuous wall and a more consistent compressive strength for the finished sintered ceramic ball 100, because, at least in part, the plug 208 is able to be oriented along the bottom of the unsintered ceramic ball 200 during the sintered process as described below.

Figure 10:
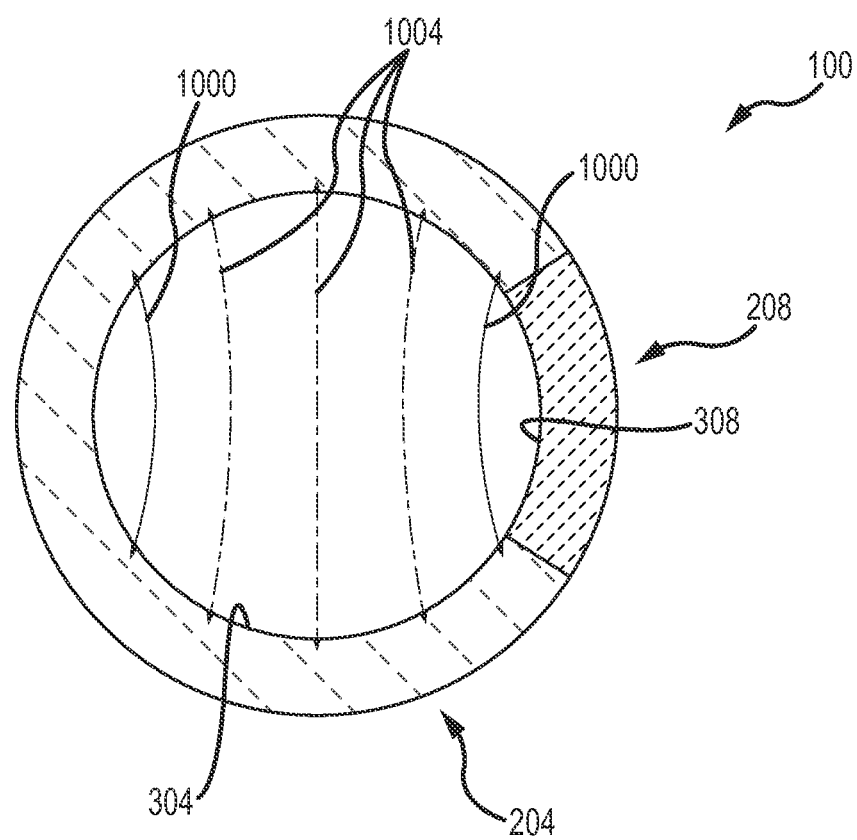
FIG. 10 is a cross-sectional view of an embodiment of a hollow ceramic ball that includes furrows and/or striations along its interior surface for providing preferential break lines.

Referring now to FIG. 10, in at least one embodiment, the interior surface 304 of the incomplete ball portion 204 is modified to include one or more furrows 1000 and/or striations 1004 or similar features to provide a localized thinner wall thickness, thereby providing a preferential break line within the sintered ceramic ball 100 when it is crushed, such as after its intended use in hydraulic fracturing operations. By way of example, furrows 1000 and/or striations 1004 can be provided within the interior of the sintered ceramic ball 100 by causing a shaping tool (not shown) to be used to contact the inner surface 304 of the incomplete ball portion 204, thereby removing a small portion of the ceramic material while in its green state before it is fired. In at least one embodiment, the striations 1004 may be spaced apart indentations or nicks in the ceramic material forming the wall of the unsintered ceramic ball 200 that is later sintered.

Figure 11:
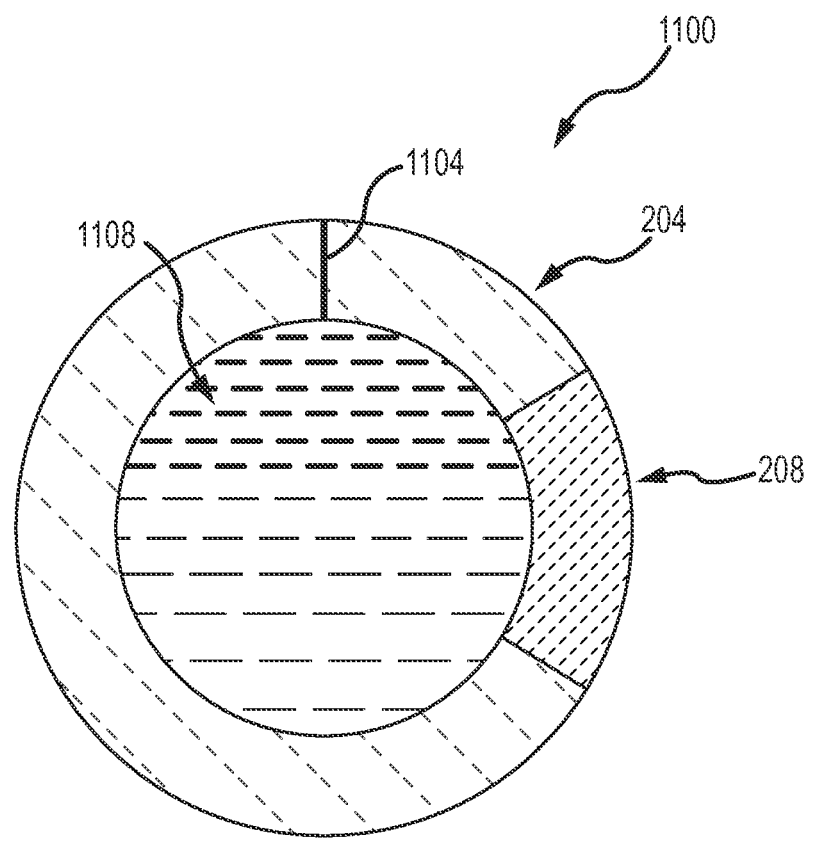
FIG. 11 is a cross-sectional view of a fluid-filled ceramic ball.

Referring now to FIG. 11, in at least one embodiment, the initially hollow space 300 residing within the interior of the sintered ceramic ball 100 is later filled with a liquid, such as water or a lubricant such that the final ball is a liquid-filled ceramic ball. By way of example, such liquid-filled ceramic ball may be made by forming a sintered ceramic ball 100, and thereafter drilling one or more holes 1104 within the ceramic wall of the sintered ceramic ball 100 and then injecting a liquid 1108 into the hollow space 300, and thereafter, plugging the one or more holes 1104 with a material such as epoxy. The liquid-filled ceramic ball 1100 has different compressive strength properties than a sintered ceramic ball 100 that possesses an air-filled hollow space 300 within its interior. In addition, a liquid, such as a lubricant, can assist with passage of the pieces away from the valve seat after the liquid-filled ceramic ball 1100 is used and broken.

Figure 12:
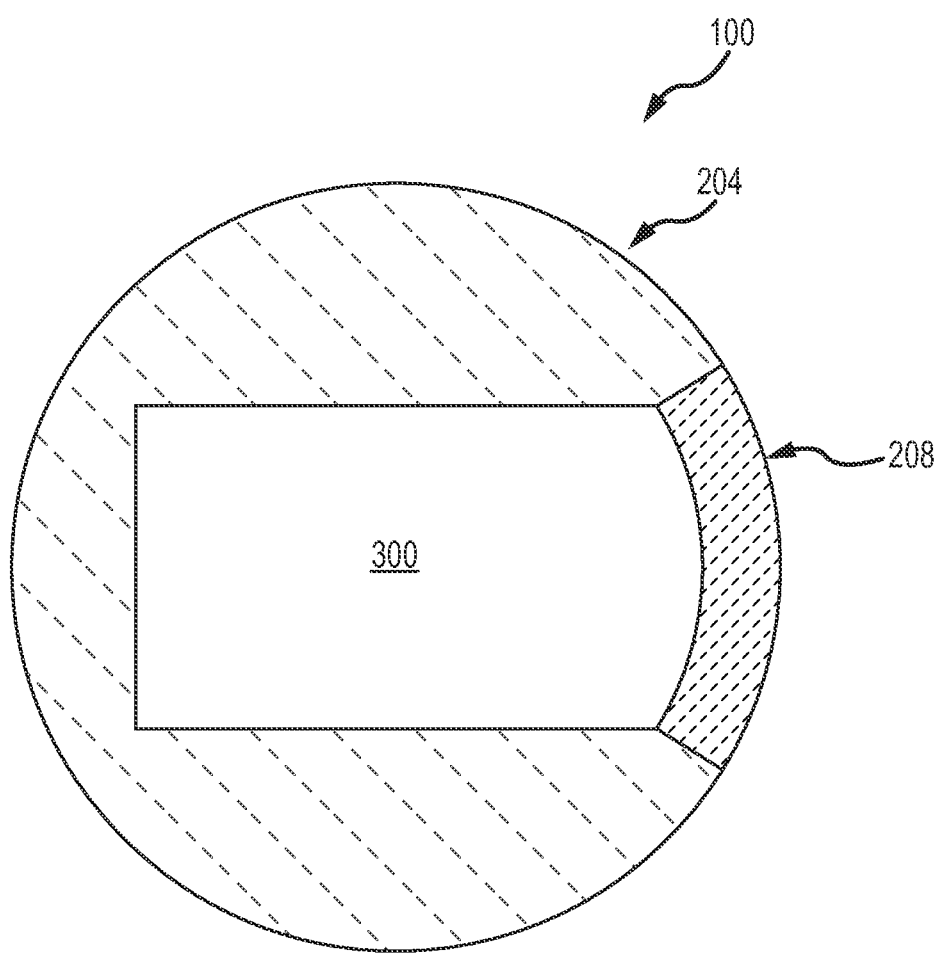
FIG. 12 is a cross-sectional view of an embodiment of a hollow ceramic ball wherein the interior hollow space is not substantially spherical in shape.

Referring now to FIG. 12, in at least one embodiment, the hollow space formed in the incomplete ball portion is not spherical or substantially spherical in shape. More particularly, the interior space or hollow region 300 may be a different shape than spherical or substantially spherical in shape, such as a cylindrical shape. For such an embodiment, the wall thickness of the ceramic ball is not uniform. The interior space 300 may be filled with fluid after the hollow ceramic ball is sintered, thereby yielding a fluid-filled ceramic ball.

Manufacturing Methodologies for Making a Hollow Ceramic Ball

The hollow ceramic balls 100 described herein may be made using a variety of techniques. As described above, hollow ceramic balls 100 may be formed using multiple pieces that are then joined together.

Figure 13:
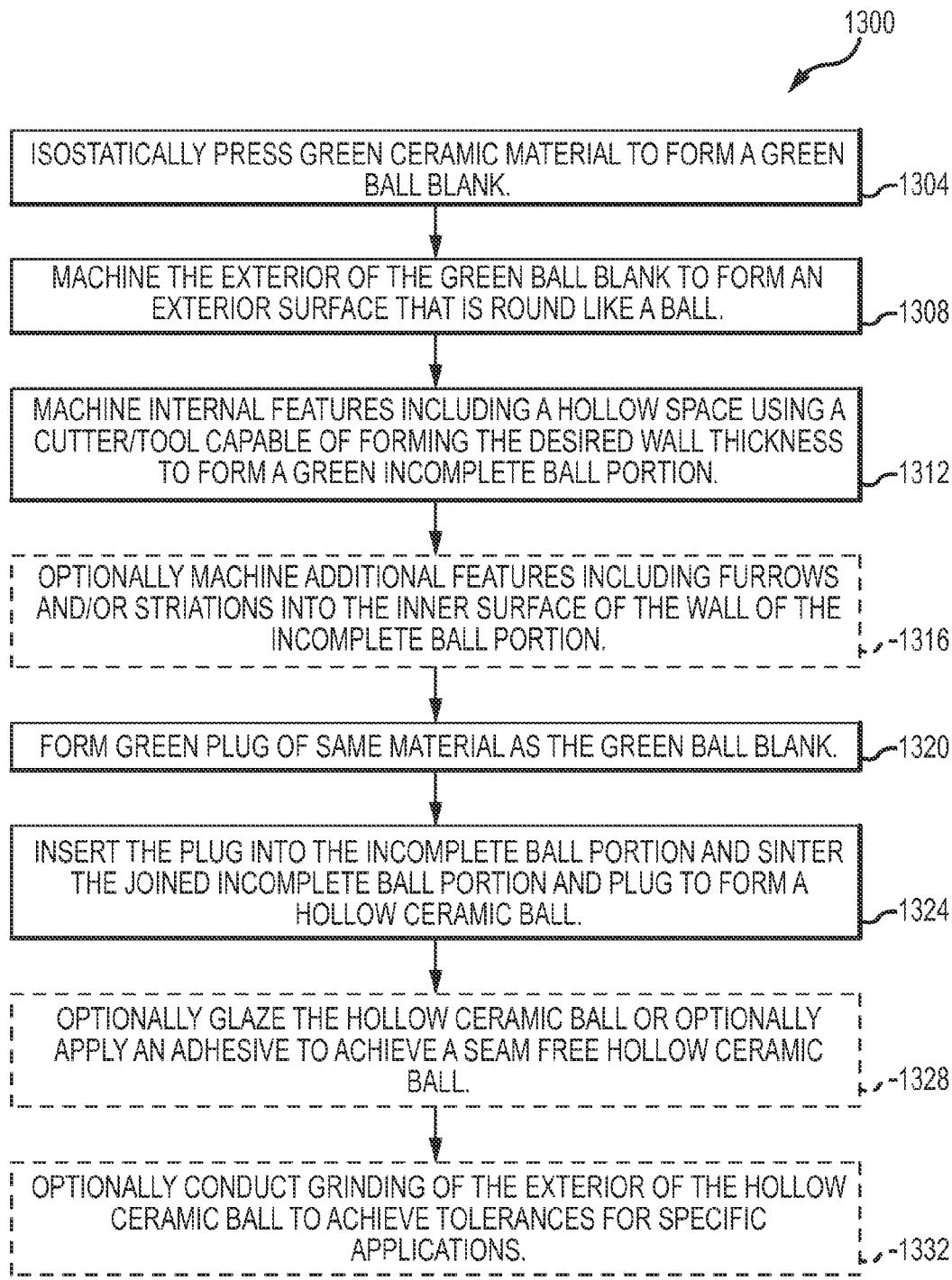
FIG. 13 is a flow diagram illustrating and embodiment for a method of making a hollow ceramic ball.

Referring now to FIG. 13, a method of manufacturing 1300 a sintered ceramic ball 100 is provided. More particularly, at 1304 an incomplete ball portion 204 is made from a solid block of "green" (unsintered) ceramic material that is formed by isostatic pressing of ceramic material located in a container. In at least one embodiment, the ceramic material type is 80-94 w/w % $Al_2O_3$, with fractional amounts of other materials. As those skilled in the art will appreciate, different amounts of $Al_2O_3$, can be used other than 80-94 w/w % $Al_2O_3$. For example, depending upon the desired compressive strength value of the finished sintered ceramic ball 100, higher or lower purity $Al_2O_3$ may be used. As those skilled in the art will further appreciate, for example, a sintered ceramic ball 100 can be manufactured using a material having up to 99.9 w/w % $Al_2O_3$. Use of such higher $Al_2O_3$ material can be bonded using lower purity joint compound when mating the plug 208 to the incomplete ceramic ball 204. Accordingly, material types as presented herein are not to be interpreted as limiting unless specifically claimed.

In accordance with at least one embodiment, when isostatically pressing the green ceramic material to form a ball blank, the ball blank may include a spacer to form a starter hole or starter hollow space pressed into the green material to facilitate later internal machining of the hollow ceramic ball.

After isostatic pressing green ceramic material at 1304, the material is removed from its container and is machined at 1308 to yield a substantially round body with a substantially uniform outer surface (with the exception of anchoring locations that are used to hold the block during the machining process; these locations are later modified to provide a continuous round exterior surface).

At 1312, the hollow space 300 is formed in the incomplete ball portion, wherein a cutter/tool is used to hollow out the interior of the incomplete ball portion. More particularly, the substantially round body is hollowed out using a vacuum chuck to hold the green ceramic material, with one or more tools used to carve out the material from the interior of the incomplete ball portion 204, thereby yielding a substantially uniform interior surface 304 with an opening 212, wherein the opening 212 includes a shape for receiving a plug 208. If a starter hole or starter hollow space was pressed into the green material to facilitate internal machining of the sintered ceramic ball at step 1304, then the starter hole may be used for initial entry of the cutter tool to advance within the interior of the incomplete ball portion.

As an optional step, at 1316 the inner surface 304 of the incomplete ceramic ball 204 may be further modified to include one or more features, such as furrows 1000 and/or striations 1004 to form preferential breakage lines along the inner surface 304.

As a separate step, at 1320 a green plug is formed of the same material as the green ball blank. Here it is noted that a green plug may be formed at any point in the foregoing process, such as before, during or after any of the steps 1304 through 1316 because an order for forming the plug is not required, so long as it is formed before being needed for joining with the incomplete ball portion prior to sintering the plug within the incomplete ball portion.

Figure 14:
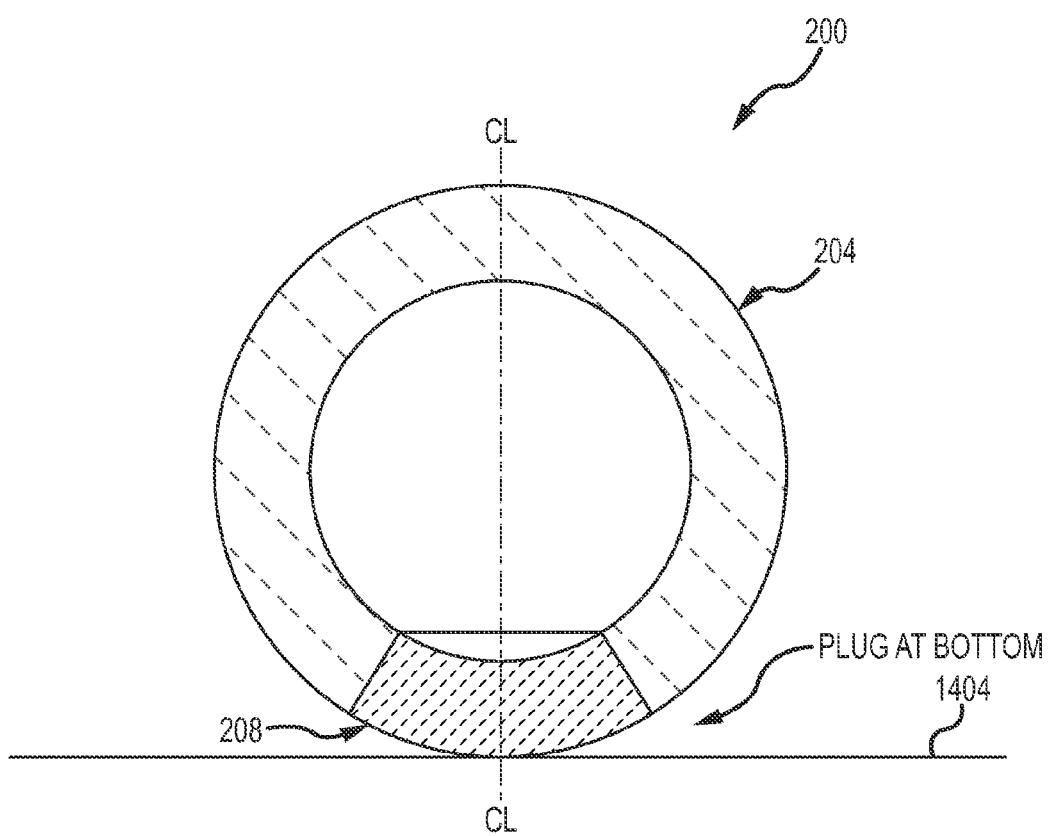
FIG. 14 is a cross-sectional view with a plug oriented downward for sintering the green ceramic material to form a sintered hollow ceramic ball.

At 1324, a plug 208 is inserted into the opening 212 and then the two pieces, now mated, are sintered. More particularly, plug and the incomplete ball portion are co-fired as a single joined unit, wherein the plug 208 resides within the hole 212 of the incomplete ball portion 204 during firing process. Preferably, the plug 208 is located in a downward position relative to the incomplete ball portion 204. Such positioning with the plug in a downward configuration 1400 is shown in FIG. 14, with the plug resting on support 1404. Support 1404 may be curved to match the curvature of the unsintered ceramic ball 200. By orienting the plug 208 in a downward orientation relative to the overlying incomplete ball portion 204, bonding is improved along the sideslopes 224 and 228 between the plug 208 and the incomplete ball portion 204 during the sintering process.

At 1328, an optional glazing of the sintered ceramic ball is performed. However, it is to be understood that glazing is not required.

At 1332, an optional grinding of the exterior is performed to further modify the exterior surface of the sintered ceramic ball 100. However, it is to be understood that grinding one or more portions of the exterior surface 104 of the sintered ceramic ball 100 is not required. Thus, in at least one embodiment, no machining is performed after firing the joined incomplete ball portion and the plug portion.

Other methods of making a sintered ceramic ball 100 are also available. In at least one embodiment, at least one of the pieces of the unsintered ceramic ball 200 is formed by casting the piece in a mold. More particularly, the incomplete ball portion 204 may be cast in a mold and thereafter, a plug 208 fitted to the incomplete ball portion 204, thereby forming an unsintered hollow ceramic ball 200, which thereafter can be sintered.

In another embodiment, both the incomplete ball portion 204 and the plug 208 are both formed from a casting process. For example, the incomplete ball portion 204 is cast in a first mold and the plug 208 is cast in a second mold. The pieces are then fitted together and sintered as a single unit.

Hollow Ceramic Ball Use

The finished sintered ceramic ball 100 has structural characteristics suitable for use in certain applications, such as use in equipment used in hydraulic fracturing operations. More particularly, the finished sintered ceramic balls are not anticipated for use as a proppant because they are too large. However, they can be used during certain operations associated with the hydraulic fracturing process. More particularly, for certain hydraulic fracturing operations, and by way of non-limiting example, outside diameters OD for the sintered ceramic balls 100 range between about 0.75 inch to 6 inches. More particularly, a variety of size ranges can be provided to meet the need for a gradation of sintered ceramic balls 100 usable in hydraulic fracturing operations. By way of example, hollow ceramic balls 100 with an outside diameter of 0.75 inch, 1.0 inch, 1.5 inches, 2.0 inches, 2.5 inches, 3.0 inches, 3.5 inches, 4.0 inches, 4.5 inches, 5.0 inches, 5.5 inches, 6.0 inches, as well as fractional sizes between these values can be produced for providing a range of desired sizes of sintered ceramic balls. Each of the foregoing sizes may have different wall thicknesses to provided crush strengths within desired tolerance ranges.

When hydraulic fracturing operations dictate, the sintered hollow ceramic balls are being broken during hydraulic fracturing operations. That is, the sintered hollow ceramic balls are intentionally broken, and thereafter, further well production enhancing operations are conducted, or alternatively, well production operations occur. Therefore, the sintered hollow ceramic balls have a strength that makes them suitable for withstanding significant pressures during portions of the hydraulic fracturing operations, but the sintered hollow ceramic balls also are capable of being broken with appropriate well bore tools. Accordingly, the sintered hollow ceramic balls are a "disposable" article that allows them to be used in an unbroken configuration, and thereafter broken so that further production-enhancement procedures can be conducted at the well.

The sintered hollow ceramic balls 100 described herein may have further application to potable water production wells, deep injection wells (such as for contaminated liquids and/or oil and gas field injection wells), and environmental clean-up or treatment wells and/or boreholes. Accordingly, use of the sintered hollow ceramic balls 100 (and/or liquid-filled ceramic balls) presented herein is not to be limited by the examples described herein. One or more of the foregoing are anticipated to use production enhancement processes that my use the sintered hollow ceramic balls (and/or liquid-filled ceramic balls) presented herein.

In at least one embodiment, the ceramic material type and the size of the hollow region are adjusted as needed to provide a finished ceramic ball having a desired specific gravity. Such parameters may also be adjusted to further provide a desired crush strength while maintaining a desired specific gravity. By way of example, a smaller wall thickness and larger void space may be used to provide a ceramic ball with a small specific gravity. Alternatively, a stronger material type and smaller wall thickness and larger void space may be used to provide a ceramic ball with a relatively smaller specific gravity by a relatively higher crush strength than if a weaker ceramic material were used. For ceramic material possessing 80-94 w/w % $Al_2O_3$, the density is approximately 3.70 g/cc. As those skilled in the art will appreciate, density is related to the purity of the alumina grade. A typical density for 94% alumina would be about 3.70 g/cc, whereas a value of 3.42 g/cc would be typical for 90% alumina (the higher the purity, the higher the density). For a high grade material, the density of about 3.92 g/cc (99.9%) is provided. When formed into a hollow ceramic ball, the specific gravity of the finished hollow ceramic ball may be approximately 2.70 g/cc. This value can be varied to achieve a desired value for the hollow ceramic ball by varying the wall thickness and taking in account the grade of alumina used and the volumetric influence of the air inside the ball. Accordingly, and advantageously for one or more embodiments described herein, the specific gravity can be tailored to whatever the customer wants, and a specified compressive strength can be achieved in combination with the size and specific gravity of the hollow ceramic ball.

Various aspects of embodiments described herein may be combined or not combined. Accordingly, one embodiment may include all compatible features described herein, while other embodiments include less than all of the features described herein.

The one or more present inventions may be embodied in other specific forms without departing from its spirit or essential characteristics. The described embodiments are to be considered in all respects only as illustrative and not restrictive. The scope of the one or more present inventions is, therefore, indicated by the appended claims rather than by the foregoing description. All changes which come within the meaning and range of equivalency of the claims are to be embraced within their scope.

The one or more present inventions, in various embodiments, includes components, methods, processes, systems and apparatus substantially as depicted and described herein, including various embodiments, subcombinations, and subsets thereof. Those of skill in the art will understand how to make and use the one or more present inventions after understanding the present disclosure.

The one or more present inventions, in various embodiments, includes providing devices and processes in the absence of items not depicted and/or described herein or in various embodiments hereof, including in the absence of such items as may have been used in previous devices or processes (e.g., for improving performance, achieving ease and/or reducing cost of implementation).

The foregoing discussion of the one or more present inventions has been presented for purposes of illustration and description. The foregoing is not intended to limit the one or more present inventions to the form or forms disclosed herein. In the foregoing Detailed Description for example, various features of the one or more present inventions are grouped together in one or more embodiments for the purpose of streamlining the disclosure. This method of disclosure is not to be interpreted as reflecting an intention that the claimed one or more present inventions requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the one or more present inventions.

Moreover, though the description of the one or more present inventions has included description of one or more embodiments and certain variations and modifications, other variations and modifications are within the scope of the one or more present inventions (e.g., as may be within the skill and knowledge of those in the art, after understanding the present disclosure). It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of making a sintered ceramic ball, comprising:
    forming an incomplete ball portion, the incomplete ball portion including an exterior surface and a wall with an opening contiguous with a hollow space radially interior to an inner surface of the wall;
    after forming the incomplete ball portion, inserting a plug into the opening of the incomplete ball portion; and
    after inserting the plug into the opening of the incomplete ball portion, sintering the incomplete ball portion and the plug to form a sintered ceramic ball;
    wherein an exterior plug surface area is between about 5% to 49.9% of a sum of an exterior surface area of the incomplete ceramic ball portion and the exterior plug surface area.

2. The method of claim 1, wherein the step of forming an incomplete ball portion includes forming one or more of furrows and striations along the inner surface of the wall.

3. The method of claim 1, wherein the step of inserting the plug into the opening includes applying a material to a sideslope of at least one of the opening of the incomplete ball portion and the plug.

4. The method of claim 3, wherein the sideslope is aligned along a radius of the incomplete ball portion.

5. The method of claim 1, wherein the step of sintering includes orienting the plug in a downward orientation relative to the incomplete ball portion.

6. The method of claim 1, further comprising drilling a hole into the sintered ceramic ball and inserting a liquid into a hollow space of the sintered ceramic ball after the sintering step.

\* \* \* \* \*